(12) United States Patent
O'Shea

(10) Patent No.: US 11,774,215 B2
(45) Date of Patent: Oct. 3, 2023

(54) SHEAR WIRE ADAPTOR KIT

(71) Applicant: L3Harris Release & Integrated Solutions Ltd, Brighton (GB)

(72) Inventor: Marc O'Shea, Brighton (GB)

(73) Assignee: L3Harris Release & Integrated Solutions Ltd, Brighton (GB)

( * ) Notice: Subject to any disclaimer, the term of this patent is extended or adjusted under 35 U.S.C. 154(b) by 26 days.

(21) Appl. No.: 17/639,250

(22) PCT Filed: Aug. 26, 2020

(86) PCT No.: PCT/GB2020/052043
§ 371 (c)(1),
(2) Date: Feb. 28, 2022

(87) PCT Pub. No.: WO2021/038221
PCT Pub. Date: Mar. 4, 2021

(65) Prior Publication Data
US 2022/0333897 A1    Oct. 20, 2022

(30) Foreign Application Priority Data

Aug. 30, 2019 (GB) .................... 1912770

(51) Int. Cl.
*F41F 5/00* (2006.01)
*B64D 1/02* (2006.01)
*F42C 15/20* (2006.01)

(52) U.S. Cl.
CPC .................. *F41F 5/00* (2013.01); *B64D 1/02* (2013.01); *F42C 15/20* (2013.01)

(58) Field of Classification Search
CPC .... F41F 3/06; F41F 5/00; F42C 15/20; B64D 1/04
See application file for complete search history.

(56) References Cited

U.S. PATENT DOCUMENTS

| 3,872,770 | A |   | 3/1975  | McGuire |                    |
|-----------|---|---|---------|---------|--------------------|
| 3,939,754 | A | * | 2/1976  | Dexter  | B64D 1/04 89/1.55  |
| 3,956,964 | A |   | 5/1976  | McGuire |                    |
| 3,983,784 | A | * | 10/1976 | Maughlin| B64D 1/04 89/1.55  |

(Continued)

FOREIGN PATENT DOCUMENTS

| EP | 1544103 A1 | 6/2005 |
| GB | 2040028 A  | 8/1980 |
| GB | 2586061 A  | 2/2021 |

OTHER PUBLICATIONS

International Patent Application No. PCT/GB2020/052043, International Search Report and Written Opinion, dated Dec. 15, 2020.

(Continued)

*Primary Examiner* — Bret Hayes
(74) *Attorney, Agent, or Firm* — Kilpatrick Townsend & Stockton LLP

(57) ABSTRACT

Arming apparatus is installable between twin arming units of an ejector release unit in a military aircraft, and a single fuzing unit of a store. The arming apparatus comprises sequentially breakable links which ensure reliable ejection of the store in an armed state, or jettisoning of the store in an unarmed state, as desired.

18 Claims, 8 Drawing Sheets

(56) References Cited

U.S. PATENT DOCUMENTS

| | | | | |
|---|---|---|---|---|
| 4,083,304 A | * | 4/1978 | Dexter | F42C 15/20 |
| | | | | 89/1.55 |
| 4,167,887 A | | 9/1979 | Magro | |
| 4,478,127 A | | 10/1984 | Hennings et al. | |
| 4,487,102 A | | 12/1984 | Fritz | |
| 4,567,809 A | * | 2/1986 | Van Sloun | F42C 15/20 |
| | | | | 102/221 |
| 2012/0291613 A1 | | 11/2012 | Rastegar | |

OTHER PUBLICATIONS

United Kingdom Patent Application No. 1912770.3, Combined Search and Examination Report, dated Feb. 25, 2020.
United Kingdom Patent Application No. 1912770.3, Examination Report, dated Aug. 2, 2021.
United Kingdom Patent Application No. 1912770.3, Examination Report, dated Sep. 27, 2021.
United Kingdom Patent Application No. 1912770.3, Intention to Grant, dated Dec. 1, 2021.

* cited by examiner

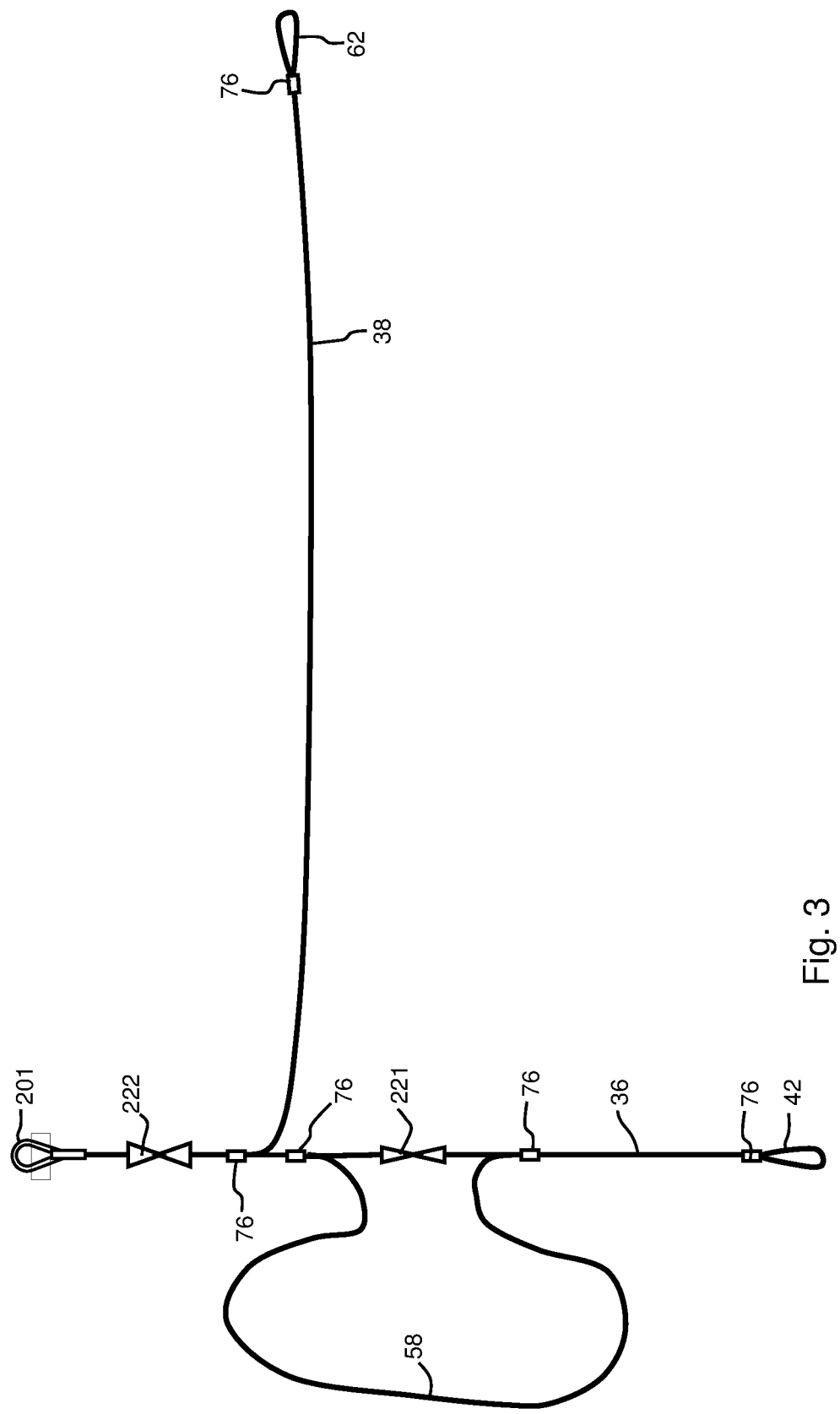

SHEAR WIRE ADAPTOR KIT

CROSS-REFERENCE TO RELATED APPLICATIONS

This application is a national stage application of International Patent Application No. PCT/GB2020/052043, filed on Aug. 26, 2020, and titled "Shear Wire Adaptor Kit," which is related to and claims priority to United Kingdom Patent Application No. 1912770.3, filed on Aug. 30, 2019, and titled "Shear Wire Adaptor Kit," both of which are hereby incorporated by reference in their entireties.

This invention relates to shear wires used to arm stores as they are being released by the ejector release unit (ERU) of a military aircraft, or to allow the store to be jettisoned unarmed when required.

An ERU typically comprises a pair of hooks which engage with corresponding lugs on the store so as to suspend the store beneath the wing of the aircraft during carriage. When the target has been acquired, the lugs are released from the suspension hooks and a pair of pistons engaging the store at fore and aft positions, is used to push the store downward, clear of the aircraft slipstream. In this way the store is released/ejected without risk of colliding with the aircraft. The pistons are typically gas-powered, with the gas supplied from a pair of pyrotechnic cartridges, one for the forward piston and the other for the aft piston.

To arm the store as it is being ejected, in one arrangement, a pair of shear wires is used, each wire containing a shearable link designed to break at a predetermined tensile load. Forward and aft arming units (AUs) are respectively associated with the corresponding hooks and pistons within the ERU. The AUs each have a downwardly opening receptacle for removably retaining a solid metal anchoring eye crimped onto the upper end of the corresponding shear wire. A spring-loaded ball detent prevents the anchoring eye from falling out of the receptacle under gravity/g-force/vibration. When it is desired to release the store from the aircraft in an armed state, the pyrotechnic cartridges are fired. Solenoid operated latches can lock the ball detents to firmly retain the shear wire anchoring eyes in the AUs as the ERU pistons extend. The solenoids are energized to lock the ball detents shortly after the pyrotechnic cartridges are fired, based on an electrical signal indicating that the pilot has requested to arm the store. The lower ends of the shear wires are attached to fuze unit (FZU) bails extending upward from the store. As the store separates from the aircraft, tension is applied to the FZU bails via the shear wires, and this arms the store. The shearable links in the shear wires then break and the store leaves the aircraft in an armed state. If the pilot fires the pyrotechnic cartridges to eject the store but does not provide the request to arm signal, the solenoid latches are not operated. The shear wire links remain unbroken and instead their anchoring eyes are pulled out of the unlocked ball detents in the AUs. In this scenario, insufficient pulling force is applied to the FZU bail(s) to arm the store. The store is therefore jettisoned from the aircraft in an unarmed (safe) state. Shear wire remnants which are "missing" from the AUs on return of the aircraft to base, indicate that the store was ejected or jettisoned unarmed. Similarly, the presence or absence of intact shear wires attached to an ejected but unexploded store can indicate its condition.

A problem arises in that different stores have different fuzing arrangements. For example, certain stores manufactured in the USA have a single FZU located between the suspension lugs. This FZU has a door or cover flap, which is pulled open by a shear wire on release/ejection of the store. A rotatable vane is thereby exposed to the airstream, to arm the store. Compatible ERUs have a single AU and anchor point for the shear wire, located substantially vertically above an attachment bail on the FZU door when the store is attached to the aircraft (i.e. the AU anchor point for the shear wire is positioned between the ERU suspension hooks). Although such single FZU-equipped stores can be mounted to the suspension hooks of ERUs having twin (fore and aft) AUs as described above, simply attaching a shear wire between one or other or each of the AUs and the FZU door can be dangerously ineffective. In some cases, the shear wires can jam in their AU due to the large angles between them and the AU receptacles. This can lead to opening of the FZU door even when the AU solenoid latches have not been energized during ejection (i.e. the store is armed as it leaves the aircraft, when it should have remained unarmed). In other cases, the large and unpredictable angle between each shear wire and the attachment bail during ejection and uneven tension in one shear wire compared to the other, can lead to the shear wires breaking without pulling open the FZU door. The store can thereby leave the aircraft unarmed, even when the solenoid latches have operated properly to retain the shear wires in their AUs. Uneven tension in the shear wires and/or tension applied to the FZU door bail at an extreme angle can tear off the FZU door, perhaps causing the FZU to remain unarmed after ejection of the store from the aircraft, when it was intended to eject the store in an armed condition and the pilot therefore did provide the arming signal to the AU solenoids. Both the FZU and the AUs have a limited range of shear wire angles within which they will operate reliably.

EP 1544103 A1 (TDA Armements) shows a "transmission cable" running longitudinally of the store from a fixed point to a bellcrank-like lever. The lever is arranged to pull open a fuze unit door when a lateral pull is applied to the transmission cable. The lateral pull is provided by a shear wire ("activating cable") which extends substantially vertically downwards from an arming unit to the transmission cable.

U.S. Pat. No. 4,478,127 (Hennings et al.) concerns an electrical and mechanical interface for fuze systems of different stores. A bomb saddle interface module may be suitably positioned on top of the store. A large loop connects a shear lanyard to a retaining pin and to an arming wire. Release of the retaining pin opens a spring-loaded door; exposing a duct to the slipstream. Air from the duct spins a wind-powered electrical generator for the store fuze system.

U.S. Pat. No. 4,167,887 (Magro) concerns a sheath for housing and controlled pay-out of a very long mechanical pull-type control cord for a store dropped or launched from an aircraft. The cord may for example pull out a parachute, light a jet motor or thruster, initiate a wind driven rotating generator, or activate a firing fuze.

U.S. Pat. No. 4,487,102 (Fritz) is similar to U.S. Pat. No. 4,167,887, in that it describes a stowage pack containing a lanyard for arming and safe release of stores from military aircraft and for opening of stabilizing and drag fins. The lanyard may have a branched end for respectively releasing a locking pin from a wind-driven arming generator, and releasing stabilizing or brake fins on the store.

To at least partially address these difficulties, the present invention provides, assembled or as a kit, arming apparatus for a store, the arming apparatus being connectable in use between a pair of arming units (AUs) of an ejector release unit (ERU) and a fuzing unit (FZU) of the store, the arming apparatus comprising:

a first tension member having an upper end attachable to a first one of the AUs and a lower end attachable to the store;

a second tension member having an upper end attachable to the second one of the AUs and a lower end attachable to the store; and a plurality of breakable links which are arranged so that one of the breakable links has to be broken before another one of the breakable links can be broken, when the store is to be ejected from the ERU in an armed state; characterised in that the arming apparatus further comprises a FZU actuation lanyard having:

a first end couplable or coupled to the first tension member;

a second end couplable or coupled to the second tension member; and a central portion operatively couplable to the FZU;

whereby movement of the store away from the AUs puts tension onto the FZU actuation lanyard so as to operate the FZU. The breaking of the first of these links may be required before it is possible for the arming apparatus to apply a pulling force to the FZU as the store is ejected from the ERU. Some or all of the breakable links may remain unbroken when the store is ejected from the ERU in an unarmed state. This may be used to ensure that an anchoring component of the arming apparatus is pulled from each AU at an angle which mitigates the risk of jamming and/or the risk of excessive force being applied to the FZU; for example avoiding a force sufficient to arm the store.

The first and second tension members may each respectively comprise one of the first breakable links; the first tension member further comprising a first flexible drop link spanning the first breakable link thereof and having a length when extended straight that is greater than the length of the spanned portion of the first tension member when its first breakable link is intact and that spanned portion is extended straight; the second tension member further comprising a second flexible drop link spanning the first breakable link thereof and having a length when extended straight that is greater than the length of the spanned portion of the second tension member when its first breakable link is intact and that spanned portion is extended straight.

The second breakable links may be calibrated to break under a higher tensile force than the first breakable links, and may be provided:

(a) in either:
  (i) the first tension member above or below the first drop link, or
  (ii) in the first drop link,
as well as:
(b) in either:
  (i) the second tension member above or below the second drop link, or
  (ii) in the second drop link.

The first end of the FZU actuation lanyard may be couplable or coupled either:

(i) to the first tension member at a position between its first breakable link and its upper end, or
(ii) to the first flexible drop link (e.g. at a position away from the upper end of the first flexible drop link);

and the second end of the FZU actuation lanyard may be couplable or coupled either:

(i) to the second tension member at a position between its first breakable link and its upper end, or
(ii) to the second flexible drop link (e.g. at a position away from the upper end of the second flexible drop link).

The extended lengths of: the first and second tension members, the first and second drop links and the FZU actuation lanyard, may be selected so that, with the first breakable links intact, the first and second tension members extended straight, and the arming apparatus fitted between the AUs, the store and the FZU, the FZU actuation lanyard remains slack. The breaking strength of the first breakable links is sufficient to allow the upper ends of the first and second tension members to be pulled out of their AUs if the solenoid latches are de-energized. Hence, if the ERU is operated (pyrotechnic cartridges fired) with the AU solenoid latches de-energized, the store will be reliably jettisoned without applying any pulling force on the FZU; i.e. the store will be jettisoned unarmed, as the FZU cannot be operated via the slack FZU actuation lanyard.

On the other hand, if the ERU is operated with the AU solenoid latches energized, the upper ends of the first and second tension members will remain latched in their AUs. Because the lower ends of the first and second tension members are connected to the store, the first breakable links will break as the store starts to move away from the aircraft. This allows the first and second drop links to extend, until a point is reached at which the FZU actuation lanyard comes under tension, since it remains attached to the AUs via the first and second tension members (and, if coupled to them, also the drop links) and is also attached to the FZU. The FZU actuation lanyard is thus pulled into a V-shape.

The FZU actuation lanyard can be arranged to slide longitudinally relative to the FZU. Hence, when it comes under tension, the angle the FZU actuation lanyard makes on either side of the FZU will be substantially equal, and the tension in it on either side of the FZU will likewise be substantially equal. Therefore the resultant force applied to the FZU will be substantially in the direction of the bisector of the angle at the point of the V-shape, i.e. in a direction substantially normal to the ERU. The FZU actuation lanyard will therefore reliably operate the FZU (e.g. open an FZU door); in effect mimicking the single shear wire with which the single FZU was originally designed to operate.

As the store continues to move away from the ERU, the drop links fully straighten, applying tension to the second breakable links and causing them to break. This frees those portions of the first and second tension members and (depending on the location of the second breakable links), the whole or part of the drop links still attached to the store, from the AUs; allowing the freed components and the store to fall/be pushed away from the ERU. If the second breakable links are located in the first and second tension members or drop links at a position above the FZU actuation lanyard coupling positions, the FZU actuation lanyard can also fall/be pushed away with the store. Otherwise the FZU actuation lanyard (still attached to the AUs) can tear away from the FZU (e.g. tearing off an FZU door and/or door bail) as the store continues to separate from the ERU. Additionally or alternatively, the FZU can be coupled to the FZU actuation lanyard by a third tension member having a lower end coupled to the FZU, the third tension member comprising a further breakable link from the plurality of breakable links. This link can be calibrated to break at a lower tension than will damage the FZU/FZU door/FZU door bail, but remain intact at tensions which are sufficient to actuate the FZU, e.g. by opening an FZU door. This avoids overstressing of and damage to the FZU, without any requirement to closely match the extended length of the drop links to the extended length of the FZU actuation lanyard at the point of operation of the FZU.

An upper end of the third tension member may be slidable longitudinally of the FZU actuation lanyard; for example comprising an eye or loop through which the FZU actuation lanyard passes. The third tension member may be the standard shear wire link that would be fitted between the FZU and AU if the store were to be used with a compatible ERU having a suitably positioned single AU.

The extended lengths of: the first and second tension members, the first and second drop links and the FZU actuation lanyard, may be selected so that, if only one of the first and second tension members is retained or released by its arming unit as intended, (e.g. due to a pyrotechnic cartridge misfire, a worn or stuck AU or another AU or ERU malfunction) the FZU actuation lanyard will slide longitudinally relative to the FZU without applying sufficient pulling force in the direction of the ERU to cause the FZU to operate. The second breakable link in the retained tension member will then eventually break, as described above, allowing the store to be jettisoned unarmed.

The first and second tension member lower ends may be configured for securing to or adjacent to the suspension lugs of the store. For example they may each comprise a loop which can be passed through the aperture of a bail-type suspension lug, and through which the remainder of the tension member concerned (and any other components attached to it) may then be fed, to form a noose which can be tightened around the lug. In the case of mace-type lugs, a suitable aperture or bail may be specifically provided through which the tension member lower end loop can be threaded to form the noose as described above. Or other tension member end securing arrangements can be provided at suitable positions on the store, e.g. lobster claw or similar clasps, D-rings, shackles, carabines, etc. Because the AU receptacles are each in close axial alignment with a corresponding suspension lug or other fastening point on the store, the first and second tension members will be at a zero or small angle to the axis of the AU receptacles when their upper ends are pulled from the AUs. There is therefore little risk of the first and second tension member upper ends jamming in the AUs.

The first end of the FZU actuation lanyard may be releasably coupled to the first tension member/drop link and/or the second end of the FZU actuation lanyard may be releasably coupled to the second tension member/drop link; to allow ready fitment of the arming apparatus between the store and the AUs.

The drop links may each simply comprise a flexible loop. Alternatively, they may comprise slidably interlinked loops, chains, or chain-like links; or may comprise elongate flexible members shaped to have a reduced overall form factor, such as a helical coil or zig-zag when the first breakable links are intact; but which will elongate as required when the first breakable links are broken. The fully extended length of the drop link (and/or other critical dimensions of the arming apparatus or adaptor kit) may be predetermined, e.g. factory pre-set, so as to suit the ERU and store with which they are intended to be used. No fabrication or adjustment is therefore required by the armorer in the field. This reduces the possibilities for human error and helps to minimize the risk of the arming apparatus or adaptor kit operating incorrectly.

The elongation need not (but can be) resilient; i.e. the drop links need not (but may) return to or near to their original form factor after being elongated for the first time in use. The drop links in their non-elongated state may be retained in a suitable outer covering (e.g. a shrunk fitted polymer sleeve) constructed and arranged so that it does not impede the necessary elongation.

The drop links and/or tension members may be fabricated from any suitable material, including natural or synthetic fibre cord or rope, chain or flexible wire or cable, for example multi-stranded stainless steel wire. Permanent joints used in such fabrication may comprise crimped metal (e.g. stainless steel) sleeves, or any other suitable fastenings or fasteners, including, without limitation, knots, welding/brazing, and adhesives. The breakable links used in the arming apparatus may comprise shear links.

As used above and elsewhere in this specification, the terms "upper" and "lower" serve simply to identify or distinguish between different parts of the integer to which they refer. The arming apparatus and its integers, can be used or exist in many configurations and orientations relative to gravity. The terms "upper" and "lower" are used consistently in relation to a given part of an integer, independently of that integer's actual orientation relative to gravity. These terms are therefore to be construed as if assigned with the arming apparatus in the configuration and orientation fitted to an aircraft and store with the aircraft right side up and level; but then still refer to the same parts of the same integers even if the orientation and configuration of the arming apparatus is changed. The terms "forward" and "aft" should also be construed in this way.

The invention and some of its advantages and optional features may be further understood from the following description of illustrative embodiments, made with reference to the drawings, in which:

FIG. 3 is a diagrammatic illustration of a forward shear wire and FZU actuation lanyard assembly in a first embodiment of the invention;

Figure 6:
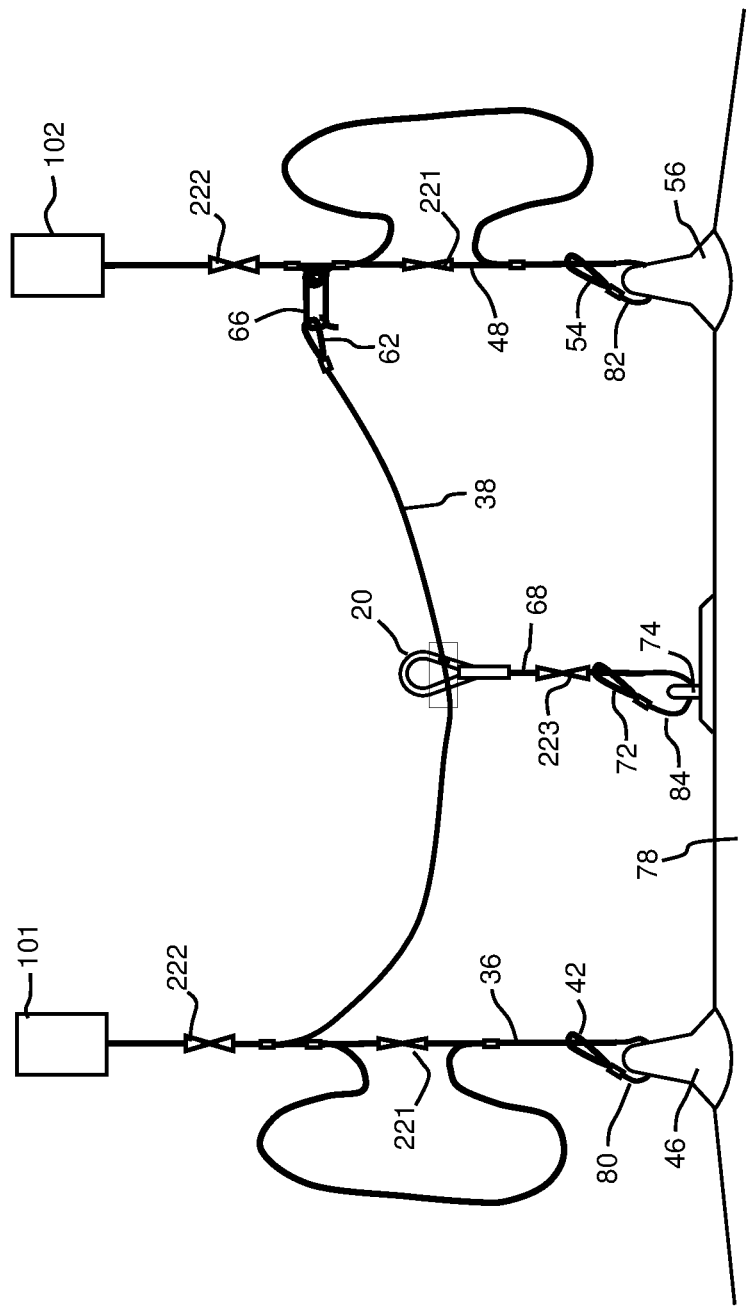
FIG. 6 shows the components of FIGS. 3-5 fully assembled and fitted between a store and forward and aft AUs of an ERU, prior to ejection or jettisoning of the store.
Figure 7:
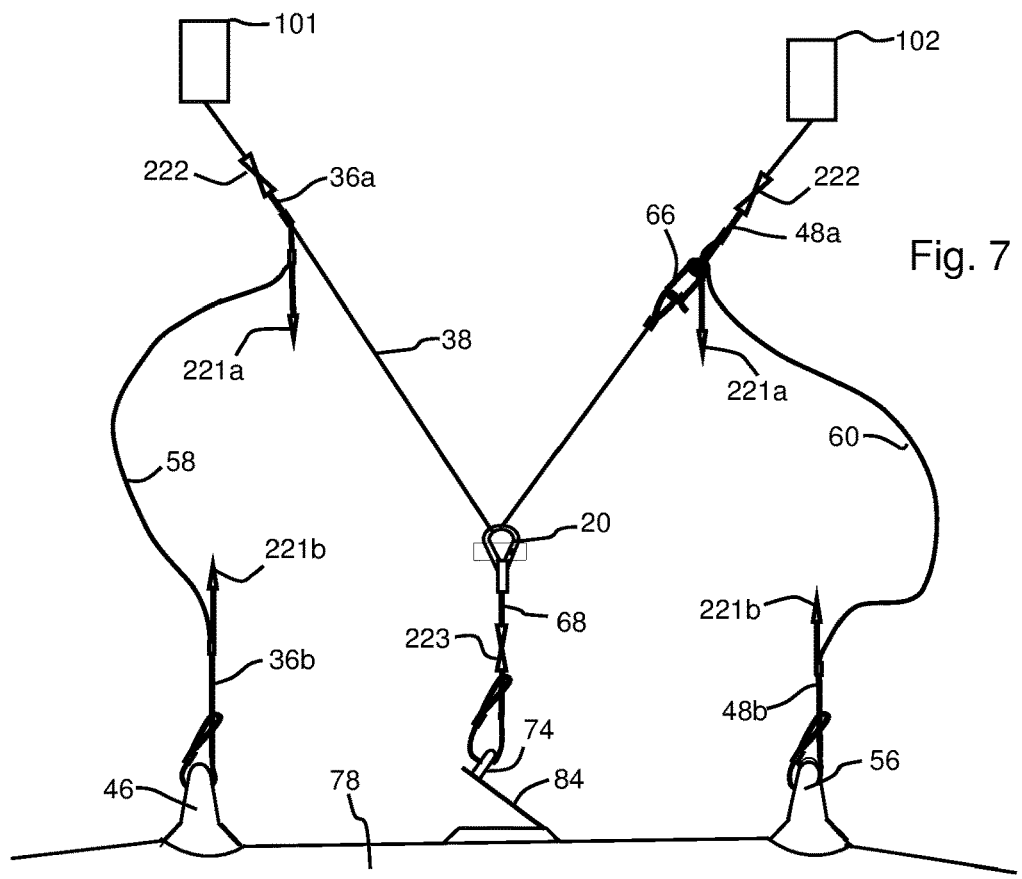
Figure 8:
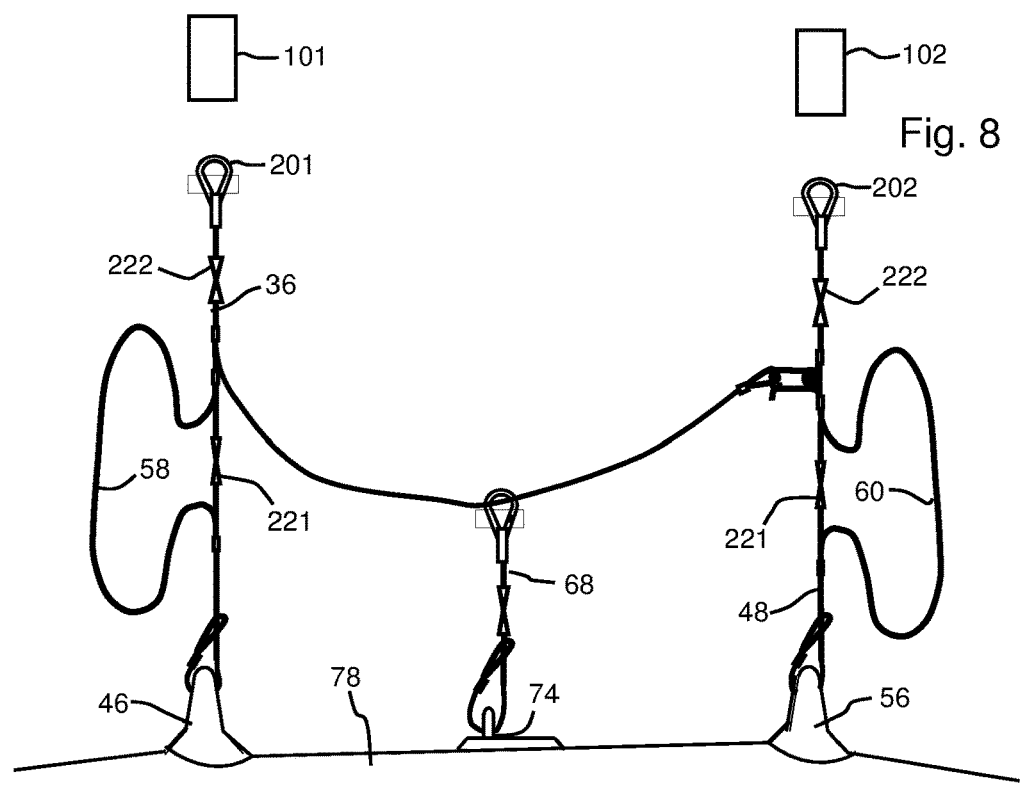
Figure 9:
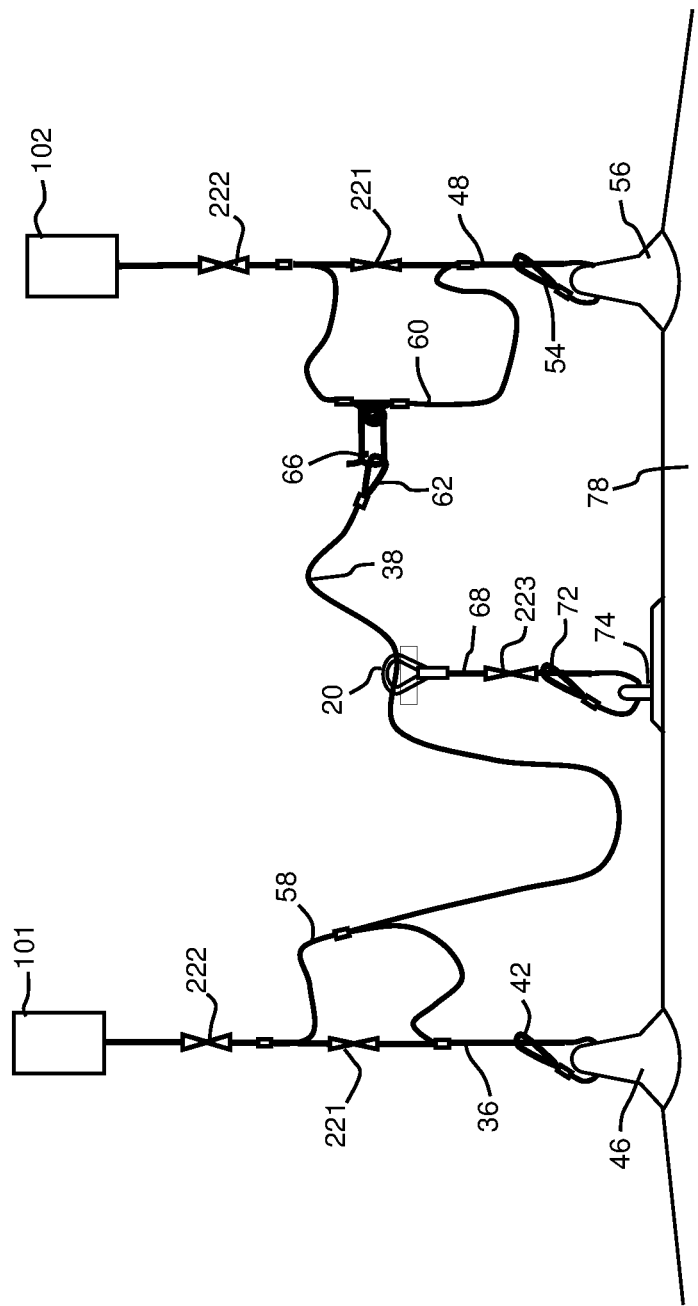
Figure 10:
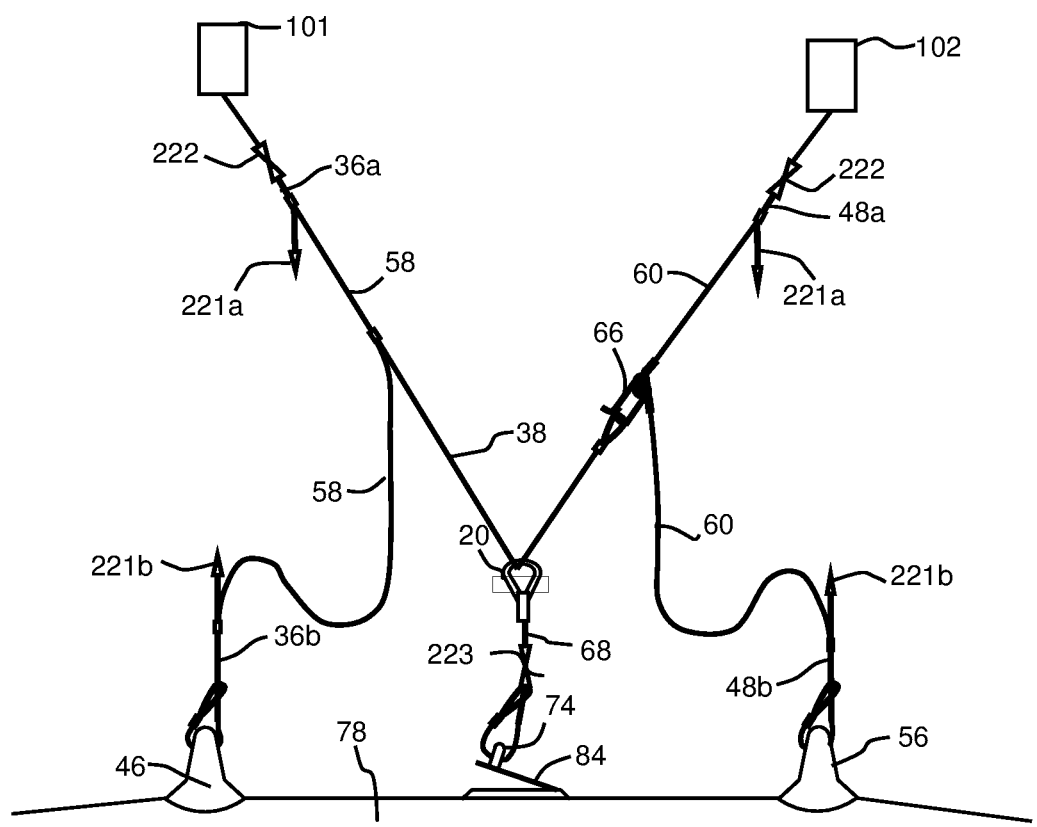

FIG. 7 corresponds to FIG. 6 but shows the configuration of the various components at one stage during ejection of the store;

FIG. 8 corresponds to FIG. 7, but shows the configuration of the various components when jettisoning the store unarmed;

FIG. 9 is a diagrammatic illustration similar to FIG. 6, of another embodiment of arming apparatus fitted between a store and forward and aft AUs of an ERU, prior to ejection or jettisoning of the store;

FIG. 10 corresponds to FIG. 9 but shows the configuration of the various components at one stage during ejection of the store; and FIG. 11 corresponds to FIG. 10 but shows the configuration of the various components at a later stage during ejection of the store.

Figure 1:
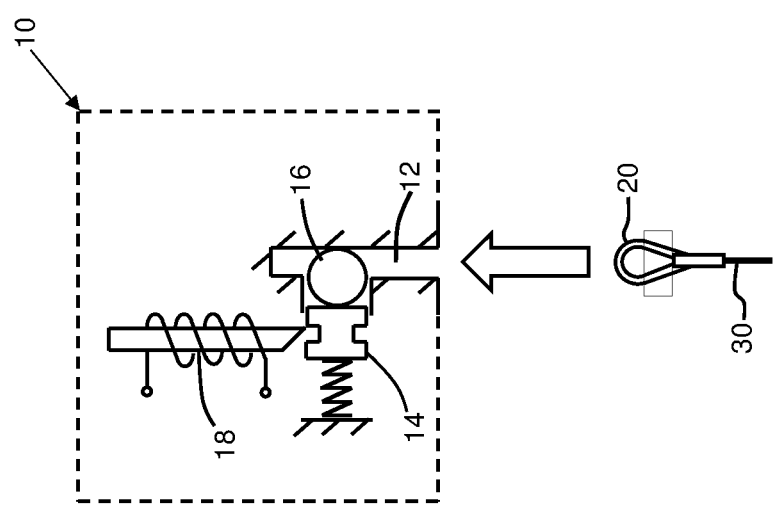
FIG. 1 shows a diagrammatic representation of an AU.

The AU 10 shown in FIG. 1 comprises a receptacle 12 open at its lower end. A crush-resistant anchoring eye 20 can be inserted into the receptacle 12, where it is removably retained by a spring-loaded ball detent 16. When it is desired to activate the AU so as to arm a store, the anchoring eye 20 is lockingly retained in the receptacle 12 by a solenoid-operated latch 14, 18. The anchoring eye 20 is crimped onto or otherwise securely fixed to an upper end of a shear wire 30. Ordinarily, the shear wire 30 is fitted so as to extend substantially in axial alignment with the receptacle 12, so that it can pull the anchoring eye 20 cleanly out of the receptacle 12 without jamming when the ERU is operated with the solenoid latch 14, 18 de-energised; e.g. when it is desired to jettison the store unarmed. The lower end of the shear wire 30 is attached to a FZU in the store (not shown). The substantially co-axial orientation of the shear wire will likewise ensure reliable operation of the FZU when the AU solenoid latch is energized to retain the anchoring eye 20, and the ERU is operated to eject the store in its armed condition. After operation of the FZU, a shear link is designed to break under a calibrated tensile force in the shear wire, as the store continues to separate from the ERU. Arming apparatus of the present invention may be used as an adaptor kit in cases such as where a single FZU needs to be connected to non-aligned forward and aft AUs, to allow reliable ejection of the store in an armed condition, as well as to allow reliable unarmed jettisoning of the store when required.

Figure 2:
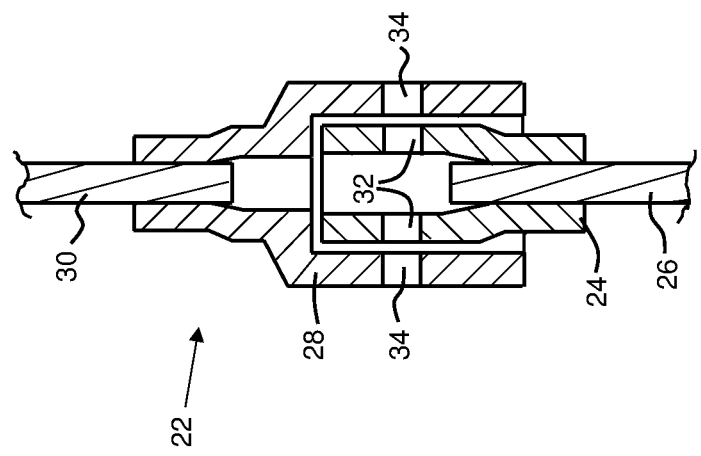
FIG. 2 shows by way of non-limiting example, one form of breakable link which may be used in arming apparatus embodying the present invention.

FIG. 2 shows a cross-section through a shear link 22 which may be used as a breakable link component in the arming apparatus of the present invention; although any suitable breakable link may be used. An inner part 24 is crimped onto a shear wire end 26. An outer part 28 is crimped onto an opposite shear wire end 30. The inner part 24 is received within the outer part 28, so that a transverse hole 32 through the inner part aligns with a transverse hole 34 through the outer part. A length of wire of appropriate shear strength (e.g. copper wire of an appropriate hardness and diameter, not shown) is then inserted through the aligned holes 32, 34 and its ends are bent to retain it in position. The whole assembly can then be encased in a protective heat shrinkable polymer sleeve, to conceal the wire ends and any other sharp edges. The diameter and hardness of the inserted wire can be selected so that the shear link 22 will break at a predetermined (calibrated) tensile force in the shear wire comprising the ends 26, 30.

Referring to FIG. 3, the first tension member 36 comprises a forward shear wire, to which an FZU actuation lanyard 38 is attached. An anchoring eye 201 is fixed to (e.g. crimped onto) the upper end of the first tension member 36 for attachment to a forward AU. The lower end of the first tension member 36 is formed into a loop 42 which allows the first tension member to be attached to a suspension lug of a store, substantially aligned with the axis of the receptacle of the forward AU. (The forward AU 101 and corresponding store suspension lug 46 are not shown in FIG. 3, but can be seen in FIG. 6).

Figure 4:
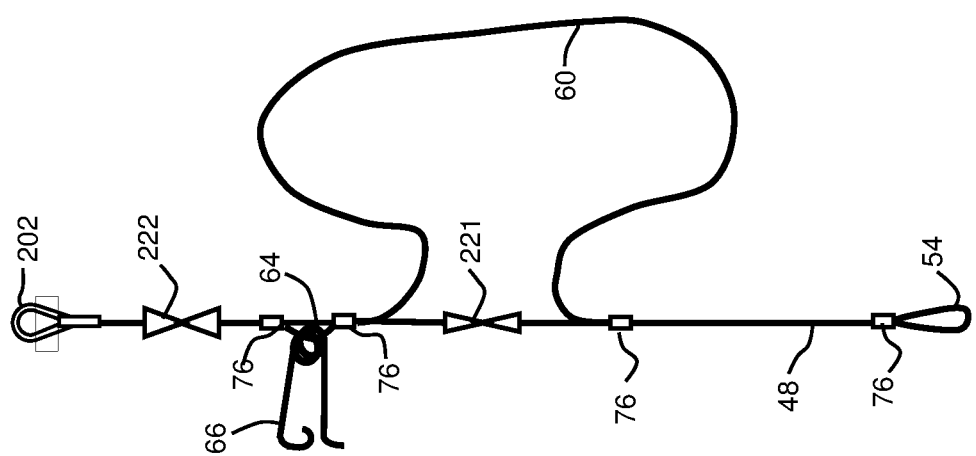
FIG. 4 is a diagrammatic illustration of a corresponding aft shear wire assembly for use with the forward shear wire and lanyard of FIG. 3.

As shown in FIG. 4, the second tension member 48 comprises an aft shear wire and, similarly to the first tension member 36, has its upper end provided with an anchoring eye 202 for attachment to an aft AU (102, FIG. 6). The lower end of the second tension member 48 is formed into a loop 54 which allows the second tension member 48 to be attached to a corresponding aft suspension lug (56, FIG. 6) of a store.

The first 36 and second 48 tension members each respectively comprise a first breakable link 221. The first breakable links 221 are each calibrated to break under a modest tensile force in the respective tension member, but which force is still sufficient to operate the FZU when required, and to pull the anchoring eyes 201, 202 out of the ball detents 16 and receptacles 12 of the AUs (see FIG. 1). For example, the first breakable links 221 may be calibrated to break at a tensile force of 147N (33 lbf). A first flexible drop link 58 is connected to the first tension member 36 so as to span the first breakable link 221. The length of the first flexible drop link 58 when extended or stretched out straight, is greater than the spacing between its connections to the first tension member 36 with the first breakable link 221 intact and the part of the first tension member 36 between those connections extended or stretched out straight.

A second flexible drop link 60 is connected to the second tension member 48 so as to span the first breakable link 221. The length of the second flexible drop link 60 when extended or stretched out straight, is greater than the spacing between its connections to the second tension member 48 with the first breakable link 221 intact and the part of the second tension member 48 between those connections extended or stretched out straight.

Referring again to FIG. 3, a first end of the FZU actuation lanyard 38 is coupled to the first tension member 36 at a position between its first breakable link 221 and its upper end. The other (second) end of the FZU actuation lanyard 38 is secured to form a loop 62. As shown in FIG. 4, the second tension member 48 has a double stranded portion 64, through which is looped a "nappy pin" sprig clip fastener 66. The fastener 66 is thus held captive on the second tension member 48 at a position between the second tension member's first breakable link 221 and its upper end.

A second breakable link 222, calibrated to break under a higher tensile force than the first breakable link 221 (for example 845 N, 190 lbf)), is provided in the first tension member 36 above the first drop link 58. Alternatively (not shown in FIG. 3), the second breakable link 222 may be provided in the first drop link 58, or in the first tension member 36 below the first drop link 58. Similarly, a further such second breakable link 222 is provided in the second tension member 48 above the second drop link 60 (FIG. 4), or (not shown in FIG. 4) in the second tension member 48 below the second drop link 60, or in the second drop link 60. When positioned in the first and second tension members 36, 48 above the FZU actuation lanyard 38 attachment point and double stranded portion 64, the second breakable links 222 allow the FZU actuation lanyard 38 and nappy pin sprig clip fastener 66 to be ejected together with the store, when the store is ejected in an armed condition; as further described below.

Figure 5:
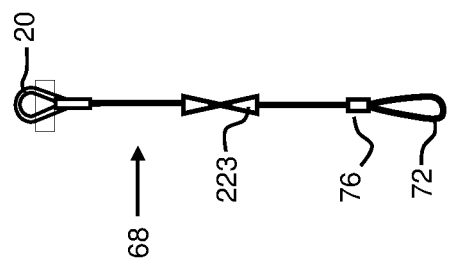
FIG. 5 shows a shear wire forming the third tension member which may be used together with the components shown in FIGS. 3 and 4 to complete the store arming apparatus concerned.

FIG. 5 shows a third tension member 68 whose upper end is provided with an anchoring eye 20 and whose lower end is secured to form a loop 72. The third tension member 68 is provided with a third breakable link 223. The breaking strength of the third breakable link 223 is calibrated to be less than the breaking strength of the second breakable link 222 (for example 147N (33 lbf)). The third tension member 68 may be used to secure the FZU actuation lanyard 38 to a FZU door bail 74 (FIG. 6).

The tension members 36, 48, 68 and drop links 58, 60 may be formed from any suitable material having the required flexibility and/or tensile strength. Suitable materials include, without limitation, natural or synthetic fibre cords or ropes; or metal chains, wires or cables, such as multi-stranded stainless steel cable. The tension members 36, 48, 68 and drop links 58, 60 may be fastened to themselves or to each other as required, using crimped metal sleeves 76 or any other suitable fastenings or fasteners, including, without limitation, knots, welding/brazing, and adhesives.

The components described above are assembled to fit between the forward and aft AUs 101, 102 and the store 78 as follows (see mainly FIG. 6). Before engagement of the ERU suspension hooks in the suspension lugs of the store, the lower loop 42 of the first tension member 36 is passed through the forward suspension lug 46 of the store. The remainder of the first tension member 36 and the parts attached to it such as the drop link 58 and FZU actuation lanyard 38 are then threaded through the lower loop 42 to form a noose (adjustable loop) 80 around the forward suspension lug 46. Similarly, the lower loop 54 of the second tension member 48 is passed through the aft suspension lug 56. The remainder of the second tension member and attachments such as the drop link 60 and nappy pin fastener 66 are then threaded through the lower loop to form a noose 82 around the aft suspension lug 56. The lower loop 72 of the third tension member 68 is passed through the door bail 74 on the FZU. The remainder of the third tension member 68 is then passed through the loop 72 to form a noose 84 around the door bail 74. The loop 62 of the FZU actuation lanyard 38 is then passed through the anchoring eye 20 of the third tension member 68 and is fastened to the second tension member 48 by the nappy pin fastener 66. The store 78 is then offered up to the ERU and the ERU suspension hooks are engaged in the suspension lugs 46, 56. Finally the anchoring eye 201 of the first tension member 36 is clipped into the receptacle of the forward AU 101 and the anchoring eye 202 of the second tension member 48 is clipped into the receptacle of the aft AU 102, using the respective AU ball detents. This results in the assembled configuration shown in FIG. 6. Other orders of assembly may also be used which result in this configuration. In this configuration, the FZU actuation lanyard 38 and third tension member 68 are slack, so that no pulling force is applied to the FZU bail 74.

FIG. 7 shows the configuration of the various components at one stage during ejection of the store. The solenoid latches 14, 18 (see FIG. 1) are energized to lock the anchoring eyes 201, 202 (see FIGS. 3 and 4) in the AUs 101, 102 as the ERU (not shown) is operated to release the suspension hooks from the suspension lugs 46, 48 and push the store 78 downward away from the aircraft. This breaks the first breakable links 221 (the broken and separated parts being referenced 221a and 221b in FIG. 7). Continued downward motion of the store 78 relative to the ERU and AUs 101, 102, puts tension onto the FZU actuation lanyard 38, pulling it and the attached upper parts of the first and second tension members into a V-shape. This in turn puts tension onto the third tension member 68, and pulls open the FZU door 84 vial bail 74. The FZU actuation lanyard 38 is able to slide through the anchoring eye 20 of the third tension member 68 so that the V-shape is substantially mirror symmetrical on either side of the third tension member 68, and the tension in each arm of the V is substantially equal. The FZU door bail 74 is therefore pulled in a substantially normal direction towards the ERU, mimicking the shear wire which the present arming apparatus or adaptor kit is designed to replace. It does not matter that at this stage a substantial angle may exist between the first and second tension member parts 36a, 36b and the respective receptacle axes of the receptacles of the AUs 101, 102; because at this point it is desired to retain the tension member upper ends in their AUs and therefore any jamming is not a problem.

When the door 84 has been fully opened, its resistance to further motion increases, breaking the third breakable link 223. The FZU actuation lanyard 38 now becomes slack again. At this point the drop links 58, 60 have begun to uncurl and extend as the store 78 moves downwards away from the AUs 101, 102 and the broken first link parts 221a, 221b continue to separate from one another. Further downward movement of the store now separates the broken parts (not shown) of the third breakable link 223 and fully straightens and extends the drop link 58 and the attached upper and lower parts 36a, 36b of the first tension member, and likewise the drop link 60 and the attached upper and lower parts 48a, 48b of the second tension member are fully straightened and extended. As the first and second tension members and their drop links are still firmly latched in the AUs 101, 102 at their upper ends 36a, 48a and are firmly looped around the store suspension lugs 46, 56 at their lower ends 36b, 48b, continued downward movement of the store 78 therefore breaks the second breakable links 222. Residual parts of these links, and the portions of the first and second tension member upper parts 36a, 48a above them, therefore remain anchored in the AUs 101, 102. The remainder of the arming apparatus is ejected together with the (now armed) store 78.

If one of the solenoid operated latches 18 fails to engage as intended, the corresponding anchoring eye 201 or 202 will pull out of its AU and the corresponding first and second breakable links 221, 222 will remain unbroken. Or if one of the ball detents 16 fails to disengage the anchoring eye as intended, the eye will remain lodged in the AU and the corresponding first and second links will break. In either case, the first breakable link 221 in the retained tension member will break, but the FZU actuation lanyard 38 will pull through the eye 20 of the third tension member 68 without putting any substantial tension on it (since the other end of the FZU actuation lanyard 38 is not anchored). This allows the retained drop link 58 or 60 (as the case may be) to fully straighten and extend, and break the second breakable link 222 in the retained tension member. The store 78 is therefore jettisoned with the FZU door 84 safely closed, because no substantial tension has been applied to the third tension member 68.

FIG. 8 corresponds to FIG. 7, but shows the configuration of the various components when jettisoning the store unarmed. Neither of the solenoid latches 14, 18 in the AUs 101, 102 is energised as the ERU pushes the store 78 away from the aircraft. The anchoring eyes 201, 202 are therefore pulled out of the ball detents 16 and out of the receptacles 12 in the AUs 101, 102 (see FIG. 1 in conjunction with FIG. 8). The anchoring eyes 201, 202 are pulled substantially straight out of the receptacles in the AUs 101, 102 with little risk of jamming, due to the alignment between the AUs 101, 102 and the corresponding suspension lugs 46, 56 to which the first and second tension members 36, 48 are attached. The first and second breakable links 221, 222 in both the first and second tension members 36, 48 remain unbroken, since the pull-out force of the anchoring eyes 201, 202 is less than the breaking tension for the first breakable links 221 (and therefore also less than the breaking tension for the second breakable links 222). The drop links 58, 62 do not uncurl and the FZU actuation lanyard 38 and the third tension member 68 remain slack. The FZU door is therefore not pulled open. The entire arming apparatus is therefore jettisoned together with the (unarmed) store 78.

FIG. 9 is a diagrammatic illustration similar to FIG. 6, showing arming apparatus fitted between a store 78 and forward 101 and aft 102 AUs of an ERU, prior to ejection or jettisoning of the store. Like reference characters are used to identify like parts. The main difference between the two Figures is that in FIG. 9, the FZU actuation lanyard 38 is attached to the drop link 58 (e.g. at a position away from its ends, as shown in FIG. 9), rather than to the first tension member 36. Similarly the nappy pin fastener 66 is attached to a double stranded portion of the drop link 60, rather than to a double stranded portion of the second tension member 48. The two arrangements of FIGS. 6 and 9 and their assembly methods otherwise may be substantially identical to each other. Again the second breakable links 222 of FIG. 9 may be provided in the drop links 58, 60, or in the parts of the first and second tension members 36, 42 below the drop links 58, 60; as alternatives to providing the breakable links 222 in the portions of the first and second tension members 36, 48 above the drop links 58, 60 as actually illustrated.

FIG. 10 generally corresponds to FIG. 7, and shows the first and second tension member upper parts 36a, 48a retained in the AUs 101, 102 by the solenoid latches 14, 18. The first breakable links 221a 221b have broken and the drop links 58, 60 have partially uncurled and straightened, so as to put the FZU actuation lanyard 38 and third tension member 68 under tension. The FZU door 84 is therefore being pulled open, to arm the store 78. Alternatively, if the solenoid operated latches 14, 18 within the AUs 101, 102 are not energised, the anchoring eyes 201, 202 (not visible in FIG. 10) are pulled cleanly straight out of the AUs 101, 102 by the first and second tension members 36, 48 attached to the store mounting lugs 46, 56. The first and second breakable links 221, 222 remain unbroken and the FZU actuation lanyard 38 and third tension member 68 remain slack. The FZU door therefore remains closed and the store 78 is jettisoned from the ERU unarmed. The same failsafe configuration is available as described above with reference to FIG. 7, in the event that one of the solenoid operated latches is not energized as the ERU pushes the store away from the aircraft, or in the event that one of the anchoring eyes 201, 202 jams in its AU during intended unarmed jettisoning of the store.

Figure 11:
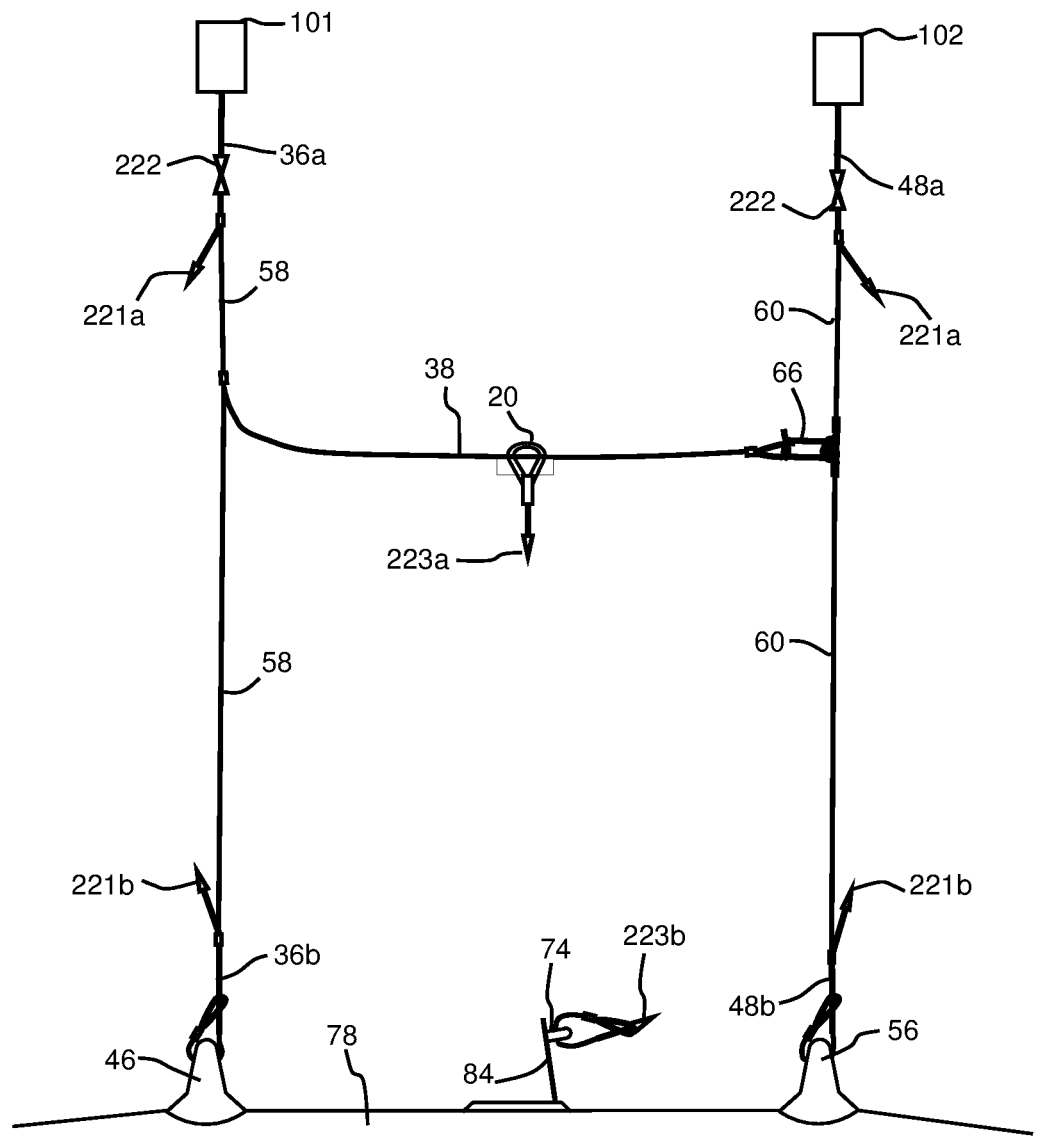

Finally, FIG. 11 corresponds to FIG. 10 but shows the third breakable link broken into two parts 223a, 223b and the drop links 58, 60 fully uncurled/extended. As the first tension member 36a, 36b and the first drop link 58 remain connected between the forward AU 101 and the forward store mounting lug 46 at this point, (and similarly the second tension member 48a, 48b and the second drop link 60 remain connected between the aft AU 102 and the aft store mounting lug 56), the second breakable links 222 break to release the arming apparatus from the AUs 101, 102.

Other configurations are also possible. For example, one of the first and second tension members 36, 48 and the corresponding drop link may be configured as in FIGS. 6-8 and the other tension member/drop link may be configured as shown in FIGS. 9-11. The first tension member etc. may be fastened between the aft AU 102 and the aft store mounting lug 56, and the second tension member 48 etc. may be fastened between the forward AU 101 and the forward store mounting lug 46.

The arming apparatus and its component parts may be accurately fabricated under factory conditions, to ensure correct operation with a given ERU and store combination. No measuring, cutting, or assembly requiring tools is needed in the field.

The invention claimed is:

1. Assembled or as a kit, arming apparatus for a store, the arming apparatus being connectable in use between a pair of arming units (AUs) of an ejector release unit (ERU) and a fuzing unit (FZU) of the store, the arming apparatus comprising:

a first tension member having an upper end attachable to a first one of the AUs and a lower end attachable to the store;

a second tension member having an upper end attachable to a second one of the AUs and a lower end attachable to the store;

the first and second tension members comprising a plurality of breakable links which are arranged so that one or more first ones of the breakable links has to be broken before one or more second ones of the breakable links can be broken, when the store is to be ejected from the ERU in an armed state;

wherein the arming apparatus further comprises:

(a) a FZU actuation lanyard having a first end couplable or coupled to the first tension member, and a second end couplable or coupled to the second tension member; and (b) a third tension member comprising a further breakable link, the third tension member being coupled or couplable to the FZU actuation lanyard and having a lower end coupled or couplable to the FZU.

2. The arming apparatus as claimed in claim 1, in which some or all of the breakable links remain unbroken when the store is ejected from the ERU in an unarmed state.

3. The arming apparatus as claimed in claim 1, in which the first and second tension members each respectively comprise one of the first breakable links;

the first tension member further comprising a first flexible drop link spanning the first breakable link thereof and having a length when extended straight that is greater than the length of the spanned portion of the first tension member when its first breakable link is intact and that spanned portion is extended straight;

the second tension member further comprising a second flexible drop link spanning the first breakable link thereof and having a length when extended straight that is greater than the length of the spanned portion of the second tension member when its first breakable link is intact and that spanned portion is extended straight.

4. The arming apparatus as claimed in claim 3, in which the second breakable links are calibrated to break under a higher tensile force than the first breakable links, and are provided:

(a) in either:
(i) the first tension member above or below the first drop link, or
(ii) in the first drop link, as well as:

(b) in either:
(i) the second tension member above or below the second drop link, or
(ii) in the second drop link.

5. The arming apparatus as claimed in claim 4, wherein:

the first end of the FZU actuation lanyard is couplable or coupled either:
(i) to the first tension member at a position between its first breakable link and its upper end, or
(ii) to the first flexible drop link;

and the second end of the FZU actuation lanyard is couplable or coupled either:
(i) to the second tension member at a position between its first breakable link and its upper end, or
(ii) to the second flexible drop link.

6. The arming apparatus as claimed in claim 1, in which the first end of the FZU actuation lanyard is releasably coupled to the first tension member and/or the second end of the FZU actuation lanyard is releasably coupled to the second tension member.

7. The arming apparatus as claimed in claim 1, in which the second breakable links are located in the first and second tension members at a position above the FZU actuation lanyard coupling positions.

8. The arming apparatus as claimed in claim 1, in which the FZU actuation lanyard is configured to slide longitudinally relative to the FZU.

9. The arming apparatus as claimed in claim 1, in which an upper end of the third tension member is slidable longitudinally of the FZU actuation lanyard.

10. The arming apparatus as claimed in claim 1, in which the first and second tension member lower ends are configured for securing to or adjacent to suspension lugs of the store.

11. The arming apparatus as claimed in claim 10, in which the first and second tension member lower ends each comprise a loop.

12. The arming apparatus as claimed in claim 3, in which the drop links each comprise a flexible loop.

13. The arming apparatus as claimed in claim 3, in which the drop links each comprise slidably interlinked loops, chains, or chain-like links.

14. The arming apparatus as claimed in claim 3, in which the drop links each comprise elongate flexible members shaped to have a reduced overall form factor when the first breakable links are intact, and which elongate when the first breakable links are broken.

15. The arming apparatus as claimed in claim 14, in which the drop links when in their reduced overall form factor are retained in an outer covering.

16. The arming apparatus as claimed in claim 1, in which the tension members are fabricated from natural or synthetic fibre cord or rope, chain or flexible wire or cable.

17. The arming apparatus as claimed in claim 16, comprising permanent joints used to fabricate the tension members, the permanent joints comprising crimped metal sleeves.

18. The arming apparatus as claimed in claim 1, in which the breakable links comprise shear links.

* * * * *